July 7, 1925.  J. WEIL  1,544,961
LID REMOVER
Filed Nov. 20, 1923
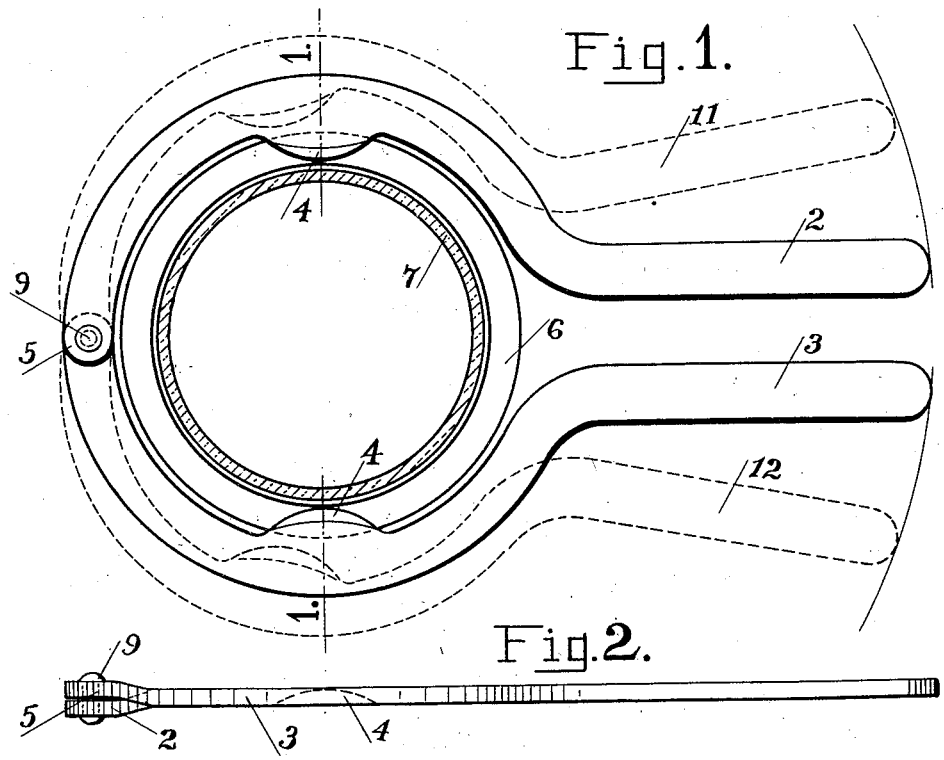
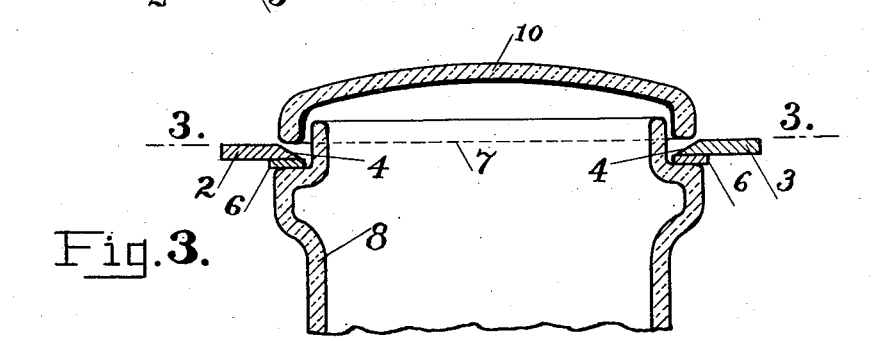
John Weil Inventor Patented July 7, 1925.

1,544,961

UNITED STATES PATENT OFFICE.

JOHN WEIL, OF MANSFIELD, OHIO.

LID REMOVER.

Application filed November 20, 1923. Serial No. 675,888.

*To all whom it may concern:*

Be it known that JOHN WEIL, a citizen of the United States of America, residing at Mansfield, in the county of Richland and State of Ohio, has invented certain new and useful Improvements in a Lid Remover, of which the following is a specification.

This invention relates to a lid remover and is particularly adapted to be used for removing lids from filled and hermetically sealed fruit jars, where the vacuum within the jar (or the like) and the added cementing (or the like) between the lid and the rubber sealing ring, causes the lid to stick, so tight, that mechanical means must be used for breaking the seal in order that the same may be removed.

The present invention contemplates the use of two relatively movable parts joined together in a most simple manner. The forms shown specifically on the drawing, is for a lid remover adapted in its use to effectually remove the lids from fruit jars (or the like) without danger of injuring the hands, as is the case when sharp instruments such as knives, ice-picks, and the like are used for that purpose. It also reduces the danger of breaking the jars or lids, or destroying the future use of the rubber fruit jar sealing rings, when the vacuum or seal is broken.

One of the objects is to produce a lid remover that will supply means to meet these conditions in the simplest and most inexpensive manner.

Another object is to make a lid remover, that is safe in use and efficient in operation.

Another object is to design a lid remover whereby several points of leverage are provided for the purpose of reducing the breaking strain on the lid when the seal is broken in its removal.

Another object is to so construct a lid remover of relative movable parts having means to exert a pressure underneath the lid for removing purposes, which may be operated with one hand, leaving the other free to hold the jar.

I attain these, and other objects by the (preferable) construction and combination of parts, hereinafter more fully described and pointed out in the claims.

The accompanying drawing shows the preferred form of the invention.

In the drawings: Figure 1, is a plan view showing the lid remover in its closed position adjacent to the fruit jar opening, and also showing the jar in section near said opening, and an outline of the rubber sealing ring in assembled relation thereto.

Figure 2 is a side or edge view of the lid remover, showing the hinge or pivot in full lines and in dotted line the wedge portion provided on the movable members of the lid remover.

Figure 3 is a vertical section at line 1—1 of Figure 1, showing in section the wedge portions of the movable members of the lid remover, also the neck portion of a jar, and the rubber sealing ring in assembled positions.

Referring to the drawings, reference numeral 2 indicates one member of the lid remover, having a wedge shaped projection with a portion 4, and an end 5, which is pivotally secured by a rivet 9 to member 3. The member 3 is the other member of the lid remover. The numerals 4 and 5 are the same as indicated on member 2. Numeral 6 represents a rubber sealing ring, and 7 represents a section of the jar on the line 3—3 of Figure 3. Numeral 8 represents a vertical cross section of the neck of a fruit jar. 10 represents a vertical section of the lid of a jar, showing it in the position to which it is raised or forced by means of the projecting wedge portions 4—4 of members 2 and 3. The dotted lines 11 and 12 show in outline the outward position of the lid remover members preparatory to being moved into a position to exert pressure upon or underneath the lid to break the seal and remove the lid from the fruit jar.

While I have chosen to illustrate and describe my invention as applied to the conventional form as shown, I do not wish to be so limited, thereby. It will be understood that immaterial changes and departures may be made from the form shown, without departing from the scope or principle of the invention as for instance the use of rotary discs or the like being employed instead of the wedge portions shown, or if preferred the use of clamping and other devices having attached thereto lever means to produce lifting action, instead of the practical and effective means shown and described, herein.

I claim:

1. In a tool of the character described, a pair of movable members provided with handles at one end and formed of predetermined shape at their opposite ends, which are pivotally joined together at their extremities forming the predetermined shape for movement relative to each other, a pair of wedge members made circular in form and tapered to a knife-like edge projecting inwardly from one end of the movable members, said members being disposed in opposed relation to each other and adapted when the handles are moved to exert a pressure underneath a lid to break the seal and remove the lid, when desired, as and for the purpose described.

2. In a tool of the character described, a pair of movable members provided with handles at one end and formed circular at their opposite ends to extend around a bottle or the like, said movable members being pivotally secured together at the circular extremities for movement relative to each other, said movable members also being provided at the extremities opposite the handles thereof with a wedged shaped circular member also being tapered to a knife-like edge and positioned in opposed relation to each other, whereby the circular members can be operated to exert a pressure in opposed relation to each other under the lid to break the seal and remove the lid.

3. In a jar lid remover comprising a pair of movable members, which are pivotally connected together at one end and provided with handles on the other end to actuate the members, circular members provided on said pair of movable members in opposed relation to each other and tapered to a knife-like edge, whereby a pressure can be exerted underneath the lid to remove the same from the jar, the said members being operable by one hand of the user as and for the purpose described.

In testimony whereof I affix my signature.

JOHN WEIL.